United States Patent
Hara et al.

(10) Patent No.: US 7,796,704 B2
(45) Date of Patent: Sep. 14, 2010

(54) METHOD FOR TRANSMITTING INFORMATION IN A TELECOMMUNICATION SYSTEM FEATURING MULTIPLE FREQUENCY BANDS

(75) Inventors: Yoshitaka Hara, Rennes Cedex (FR); Kazuyoshi Oshima, Rennes Cedex (FR)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 1088 days.

(21) Appl. No.: 11/391,324

(22) Filed: Mar. 29, 2006

(65) Prior Publication Data

US 2006/0251012 A1    Nov. 9, 2006

(30) Foreign Application Priority Data

Apr. 18, 2005  (EP)  ................................. 05290859

(51) Int. Cl.
*H04L 27/04* (2006.01)
(52) U.S. Cl. ...................................... 375/295
(58) Field of Classification Search .................. 375/295, 375/367, 368; 370/328, 528, 320, 331, 335; 455/70, 522
See application file for complete search history.

(56) References Cited

U.S. PATENT DOCUMENTS

| | | | | |
|---|---|---|---|---|
| 5,568,654 A | * | 10/1996 | Fukawa | 455/456.3 |
| 7,171,233 B2 | * | 1/2007 | Sanchez | 455/552.1 |
| 7,203,208 B2 | * | 4/2007 | Ushirokawa et al. | 370/528 |
| 7,292,549 B2 | * | 11/2007 | Saito | 370/328 |

FOREIGN PATENT DOCUMENTS

| | | |
|---|---|---|
| EP | 1 331 832 A2 | 7/2003 |
| JP | 2003-289579 | 10/2003 |
| WO | WO 2005/027558 A1 | 3/2005 |

* cited by examiner

*Primary Examiner*—Khai Tran
(74) *Attorney, Agent, or Firm*—Oblon, Spivak, McClelland, Maier & Neustadt, L.L.P.

(57) ABSTRACT

A method for transmitting data in a telecommunication system including at least one communication network CNW1 including a group of radio base stations B1 able to communicate with at least one mobile terminal MT through a wireless link, which method includes at least one frequency switching step for switching an operating frequency of the wireless link from a first frequency band to a second frequency band, and a control signal transmission step in the course of which a slot including control data (Cnt, Swrq, Mst) is transmitted through a communication channel established over said wireless link. The method upgrades an existing network by allowing it to use a new band of available frequencies for the operation of the wireless link.

14 Claims, 3 Drawing Sheets

METHOD FOR TRANSMITTING INFORMATION IN A TELECOMMUNICATION SYSTEM FEATURING MULTIPLE FREQUENCY BANDS

BACKGROUND OF THE INVENTION

Field of the Invention

The present invention relates to a method for transmitting data in a telecommunication system comprising at least one group of radio base stations able to communicate with at least one mobile terminal through a wireless link.

SUMMARY OF THE INVENTION

Such a telecommunication system may include only a single communication network, such as a GSM or a CDMA (standing for "Global System for Mobiles" and "Code-Division Multiple Access") network, but said system may also include multiple communication networks comprising each a group of radio base stations, like for example a combination of a public network with a private network, or a combination of a wide-spread network with a local network. Considering a current evolution in the state of the art, a particularly advantageous use of the invention will be made in telecommunication systems including first and second communication networks belonging to different technological generations, such as second generation (2G) and third generation (3G) networks like GSM and UMTS (standing for "Universal Mobile Telecommunication System"), respectively, or third generation (3G) and future fourth generation (4G) networks. In such situations, each network will be provided with at least one band of possible operating frequencies to be used for the wireless link established between a base station belonging to said network and a mobile terminal.

Indeed, the inventors have identified a particular need which should arise among operators of telecommunication systems, related to the fact that deployment of a new communication network is a very long process which involves considerable costs, linked to all preliminary propagation studies and to the actual building of an infrastructure of the new network. These costs could advantageously be spread over time by starting the deployment of the new network in selected areas, preferably highly populated metropolitan areas featuring an important pool of potential customers on a comparatively small geographical surface, and using the infrastructure of another, already existing network for supporting communication outside those selected areas. In such circumstances, a user having taken out a subscription to the new network could access said new network and benefit from any enhaced service this new network may offer, e.g. higher data rate or communication quality, when located in one of the selected areas, and could access another, more widely deployed network, when located elsewhere, and make use of the more limited services offered by this other network for ensuring a communication continuity.

However, in order for such a business scheme to satisfy the average customer, the change from one communication network to another must be made as quickly and smoothly as possible so as not to disturb an ongoing communication. It is believed by the inventors that, although a customer may tolerate a loss of data rate or even a perceivable alteration to the quality of an ongoing communication, this customer will not tolerate a temporary interruption of its communication due to a lengthy handover process to be executed between networks or, even worse, a total loss of connection caused by a failed handover. Conversely, the telecommunication system should preferably offer an automatic adaption of any communication established between the customer and the system, in order to systematically provide said customer with the best service available at any given point in time and space.

The invention aims at meeting the aforementioned needs, by providing a method and a system according to which an upgrading of an already deployed communication network, as well as handovers between two different networks are facilitated and may be controlled dynamically.

Indeed, a method according to the opening paragraph is characterized according to the invention in that it includes at least one frequency switching step for switching an operating frequency of the wireless link from a first frequency band to a second frequency band, said method also including at least one control signal transmission step to be carried out before a frequency switching step, in the course of which transmission step a slot including control data is transmitted through a communication channel established over said wireless link.

The transmission of control data over the wireless link prior to an actual switching enables to locate the execution of the frequency switching process within the base station and the terminal, and thus to perform an adaptation of the operating frequency to be allocated to the wireless link whithout generating as much control signalling between the base station and a network controller as otherwise required for handover purposes between two separate existing telecommunication systems, such a reduction of the control signalling enabling to reduce the duration of the frequency switching process and thus to ensure communication continuity.

The control signal transmission step provided according to the invention enables to communicate control data which cannot be formatted according to a standard specification of an existing network, via an existing channel normally intended for another purpose. This in turn allows to upgrade the existing network by using it for feeding a wireless link featuring an operating frequency selected amongst a new band of available frequencies, for example higher frequencies offering higher data rates than those offered by the operating frequencies defined in the standard specification of the existing network.

The invention hence also relates, as a useful means for its embodiment, to a signal comprising a control data slot inserted within communication data to be transmitted through a communication channel established between a base station and a transceiver with which said base station is communicating.

Furthermore, if the frequency switching step is triggered according to ongoing communication conditions, the invention enables to achieve, beside the communication continuity described above, a dynamic adaptation of the service provided to a user of the innovative method, with the aim of, on the one hand, ensuring customer satisfaction, and, on the other hand, achieving an efficient management of radio resources.

According to a first variant of the invention, a method as described above and intended to be used in a telecommunication system including at least a first and a second communication networks comprising respective first and second groups of radio base stations able to communicate with at least one mobile terminal through a wireless link having an operating frequency included in one of the first and second frequency bands, respectively, at least one of said radio base stations being a dual base station belonging both to the first and second groups, may further include at least one network switching step for redirecting a communication established between the terminal and one of the first and second communication networks towards the other communication network, which network switching step is intended to be carried out by said dual radio base station and to be performed after a frequency switching step.

It should be noted here that, since the dual base station according to the invention may have autority and capacity for triggering and actually performing an frequency switching, there may theoretically be no operative need for an actual handover between the first and second networks, which enables to quicken the frequency adaptation process, as already explained above. However, it may be advantageous to additionally perform an actual redirection of the communication towards the communication network associated with the frequency band within which the new operating frequency has been selected, because said network will then be able to perform susbequent intra-network handovers more efficiently. Thanks to this variant of the invention, such an inter-network switching is made possible without adversely impacting the continuity of an ongoing communication, since lengthy handover and registration processes involved by a communication redirection will actually be carried out only after the relevant frequency switching will have been performed, said ongoing communication being then supported by the former network, at the new operating frequency, until the handover and registration processes are completed, allowing only then the new network to take over in place of the former one.

According to a second variant of the invention, which may be used alternatively or cumulatively with the first one, a method as described above may further include a priority setting step, in the course of which one of the first or second communication frequency bands is identified as being a priority target for a redirection to be carried out in the course of a frequency switching step.

The priority setting step provided in this second variant of the invention enables an automatic adaptation of the communication established between a mobile terminal and the dual base station, on the basis of a default choice defined either with the aim of providing optimal quality to the user of the mobile terminal, or with the aim of providing optimal allocation of the radio resources of the system.

According to one embodiment of the second variant of the invention, the frequency band identified as priority target in the course of the priority setting step is that one of the first and second frequency bands which features a wider band of available carrying frequencies.

This embodiment ensures that a user of the mobile terminal will be connected by default through a wireless link which offers the largest spectrum of available operating frequencies, i.e. through the less congested of the first and second frequency bands, which in turn enables to distribute the load of said frequency bands in order to optimize the overall allocation of communication resources available within the telecommunication system according to the invention.

According to another embodiment of the second variant of the invention, the frequency band identified as priority target in the course of the priority setting step is that one of the first and second frequency bands which features higher operating frequencies.

This embodiment ensures that a user of the mobile terminal will be connected by default through a wireless link which offers the highest data rate, i.e. in principle the best quality of service. If, however, the high operating frequencies were to become temporary ill-suited for supporting the ongoing communication, for example in a Non-Linear Line of Sight situation in which the link established between the mobile terminal and the dual base station happened to be obstructed by a building or any other physical obstacle, a switch would be made to the other frequency band, which would offer a lower operating frequency able to penetrate through said obstacle, another frequency switching step being bound to be triggered subsequently after removal or disappearance of this obstacle.

According to one of its hardware-oriented aspects, the invention also relates to a telecommunication system including at least one communication network comprising a group of radio base stations able to communicate with at least one mobile terminal through a wireless link, which group includes a dual base station provided with frequency switching means for switching an operating frequency of the wireless link from a first frequency band to a second frequency band, system including control signal transmission means for transmitting a slot including control data through a communication channel established over said wireless link.

According to a specific embodiment of this hardware-oriented aspect, such a telecommunication system will further include:

quantifying means for quantifying at least one parameter representative of communication conditions affecting the wireless link established between the mobile terminal and said dual base station;

analysing means for analysing said at least one parameter quantified by the quantifying means with respect to predetermined requirements; and generating means for generating at least one control signal resulting from an analysis performed by the analysing means, at least one operation mode of the frequency switching means being determined by at least one value of said control signal.

A parameter to be quantified by the quantifying means may consist in a power level, a Signal-to-Interference Ratio (SIR), a Signal-to-Interference plus Noise Ratio (SINR), in a Doppler frequency or in a delay spread in a case where the data to be transmitted is carried by means of pulse sequences. The predetermined requirements may be expressed in the form of a Quality of Service (QoS) indicator, in a maximal tolerable delay value, in a maximal packet error rate value, etc.

According to a variant of the specific embodiment described above, the dual base station includes quantifying means, analysing means and generating means.

In such a variant, the dual base station includes all necessary means for appreciating by itself wether or not the frequency switching means should be activated, which entails that the dual base station may master the frequency switching process, generally on the sole basis of quality of service requirements related to the user of the mobile terminal under consideration.

According to another variant of the specific embodiment described above, the dual base station includes quantifying means, at least one of the communication networks including a radio network controller comprising analysing means and generating means.

In such a second variant, the dual base station includes all means for actually carrying out a frequency switching process, but does not fully own the mastery of the switching process, which is to remain a privilege of the radio network controller, in which case the dual base station will feed said radio network controller with measured values representing quantified parameters, the network controller then being able to analyse said parameters with respect to requirements taking into account the overall operating conditions of the related communication network, which will allow said network controller to issue control signals which will enable to manage the communications in such a way as to distribute the communication traffic in adequation with the resources currently available in said communication network.

It should be noted here that the both variants of the specific embodiment described herinbefore are not necessarily mutually exclusive, as will be explained later on.

According to another one of its hardware-oriented aspects, the invention also relates to a transceiver able to communicate with a mobile terminal through a wireless link and including frequency switching means for switching an operating frequency of the wireless link from a first frequency band to a second frequency band, said transceiver further including control signal transmission means for transmitting a slot including control data through a communication channel established over said wireless link.

BRIEF DESCRIPTION OF THE DRAWINGS

The characteristics of the invention mentioned above, as well as others, will emerge more clearly from a reading of the following description given by way of example in relation to the accompanying figures, amongst which.

DETAILED DESCRIPTION OF THE INVENTION

Figure 1:
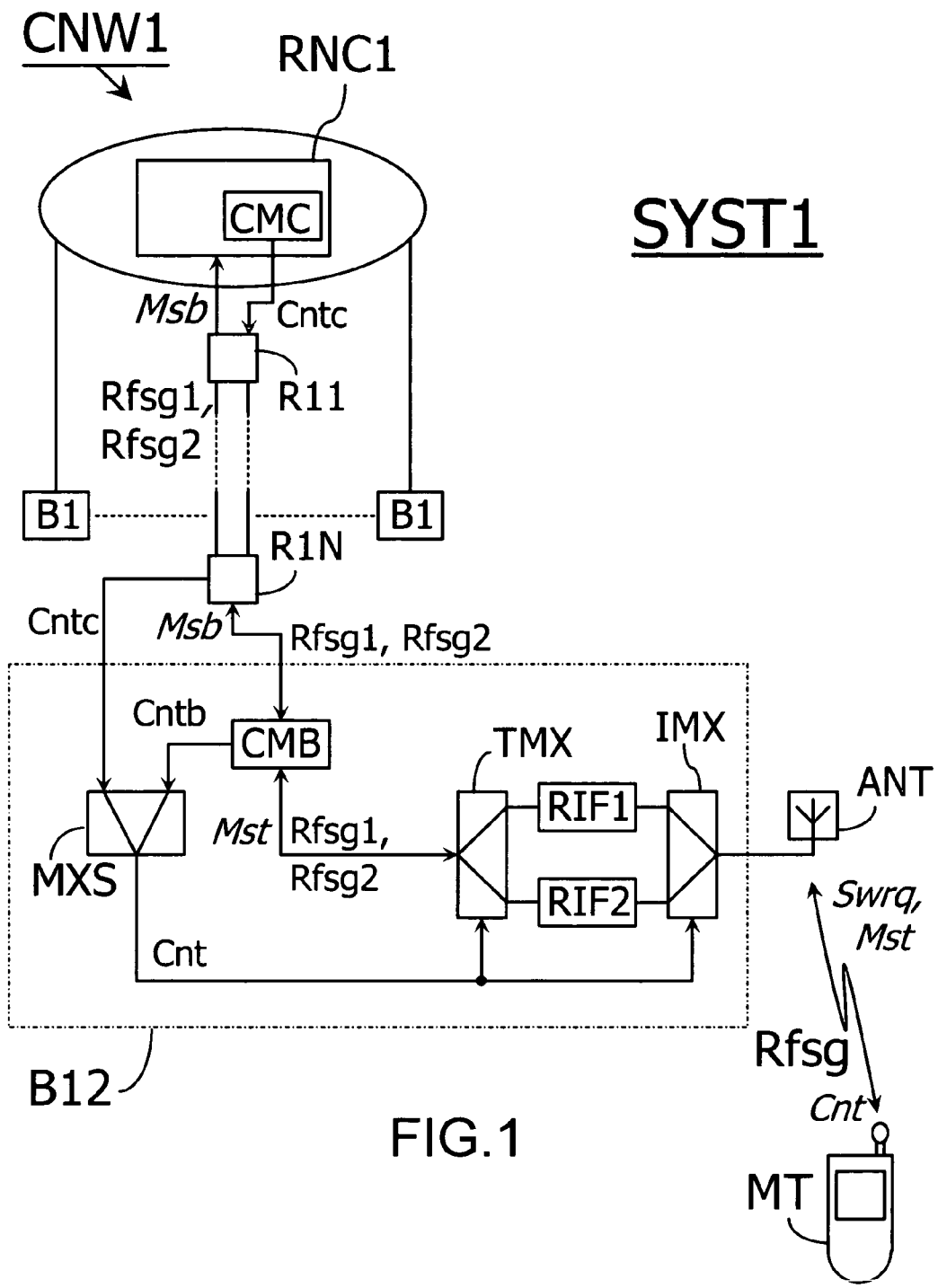
FIG. 1 is a schematic diagram depicting a telecommunication system in which the invention is embodied.

FIG. 1 is a block diagram which schematically depicts a telecommunication system SYST1 in which the invention is embodied. This telecommunication system SYST1 includes a communication network CNW1 comprising a group of radio base stations B1 able to communicate with at least one mobile terminal MT through a wireless link supported by an antenna device ANT. In the example depicted here, a specific dual base station B12 includes a first and a second radio interface RIF1 and RIF2 for processing signals whose operating frequencies are respectively included within first and second frequency bands, and communicates with the mobile terminal MT through a wireless link carrying a radio signal Rfsg. In accordance with the invention, this dual base station B12 includes frequency switching means (TMX, IMX) for selecting one of the radio interfaces RIF1 and RIF2, which frequency switching means SWM will preferably be dynamically controlled according to ongoing communication conditions, as explained hereinafter:

In the example described here, the link between the dual radio base station B12 and mobile terminal MT is deemed to be originally compliant with a standard specification of the communication network CNW1, which entails that data Rfsg1 representing the radio signal Rfsg in a format compatible with the operation of said communication network CNW1 is transmitted by and to the dual base station B12 through a networking route R11 . . . R1N defined by a radio network controller RNC1 intended to manage the operation of the communication network CNW1.

The dual base station B12 includes a base station controlling module CMB intended to be fed, through the first radio interface module RIF1 able to process signals having an operating frequency included in the first frequency band, with the radio signal Rfsg transmitted by the mobile terminal MT and picked up by antenna device ANT. The base station controlling module CMB provided in this particular example is intended to generate a base station control signal Cntb able to control the frequency switching means (TMX, IMX). This base station controlling module CMB is also able to generate so-called base station measured values Msb of quantified parameters representative of communication conditions affecting the wireless link established between the mobile terminal MT and the dual base station B12, as seen from said base station B12, and to send these base station measured values Msb, via the established networking route R11 . . . R1N, to the network controlling module CMC included in the radio network controller RNC1.

After having processed the base station measured values Msb, the radio network controller RNC1 may in this example generate a network control signal Cntc also able to control the frequency switching means (TMX, IMX). A selection between the base station control signal Cntb and the network control signal Cntc will be performed by a multiplexer MX in order to provide a control signal Cnt to the frequency switching means (TMX, IMX), the selection being made according to a priority setting which takes the following into account:

If the multiplexer MXS is rigged so that the base station control signal Cntb takes precedence over the network control signal Cntc, the dual base station B12 will master the frequency switching process, generally on the sole basis of quality of service requirements related to the user of the mobile terminal under consideration.

If, conversely, the multiplexer MXS is rigged so that the network control signal Cntc takes precedence over the base station control signal Cntb, the radio network controller RNC1 will master the frequency switching process and manage the communications in such a way as to distribute the communication traffic in adequation with the resources currently available in the communication network CNW1.

A priority setting step may have also defined a default choice either with the aim of providing optimal quality to the user of the mobile terminal, or with the aim of providing optimal allocation of the radio resources of the system SYST1.

A frequency band identified as priority target may thus be that one which features a wider band of available carrying frequencies, for example the operative frequency band of a W-CDMA (standing for "Wideband-Code Division Multiple Access) communication network of the third generation as compared to the operative frequency band of a GSM communication network of the second generation.

The frequency band identified as priority target in the course of the priority setting step may alternatively be that one of the first and second frequency bands which features higher operating frequencies, which will ensure that a user of the mobile terminal MT will be allocated by default a wireless link which offers the highest data rate, i.e. in principle the best quality of service.

In the hypothesis depicted here, once the frequency switching means (TMX, IMX) will be prompted by a suitable control signal Cnt to switch, from the first frequency band to the second frequency band, the frequency initially allocated to the communication established between the mobile terminal MT and the dual base station B12, said switching will be performed autonomously and without delay by the frequency switching means (TMX, IMX), so that said communication will not have to undergo any interruption whatsoever.

To this end, the control signal should preferably also be transmitted to the mobile terminal MT which will include a dual switchable interface similar to that formed by the frequency switching means (TMX, IMX) and the first and second radio interfaces RIF1 and RIF2. As will be explained hereinafter, data representative of this control signal Cnt may be included in a control slot specific to this purpose, but, in a case where the communication network CNW1 is an already existing network in which the use of such a control slot has not been foreseen, the invention enables to transmit control data in a downlink direction by means of the radio signal Rfsg within a slot inserted in a communication channel established over the wireless link existing between the dual base station B12 and the mobile terminal MT.

Such a control slot included in a communication channel supported by the radio signal Rfsg may also be used for allowing the mobile terminal to transmit control data in an uplink direction. Such uplink control data may for example consist in so-called terminal measured values Mst of quantified parameters representative of communication conditions affecting the wireless link established between the mobile terminal MT and the dual base station B12, as seen from said mobile terminal MT, or in requests for an increased data rate, or even in a frequency switching request Swrq in configurations where mobile terminals are supposed to own the mastery of the frequency switching process.

After the above-described frequency switching will have been performed, data Rfsg2 representing the radio signal Rfsg in a format compatible with an operating frequency selected from the second frequency band will be transmitted by and to the dual base station B12 through the networking route R11 . . . R1N, whose throughput may be increased in order to take advantage of a higher data rate offered by the wireless link if the new operating frequency is higher that the original one, without any need for generating a new networking address or a specific networking route. A request for increasing the throughput may be sent to the radio network controller RNC1 via the dual base station B12 in the same way as the base station measured values Msb.

Figure 2:
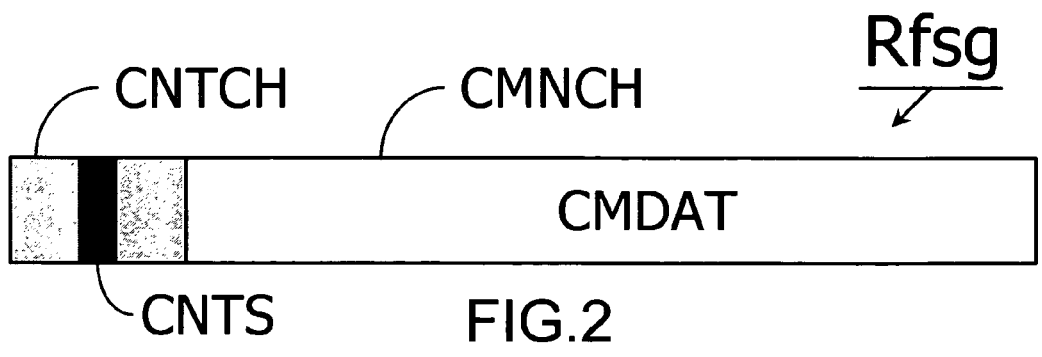
FIG. 2 is a chronogram depicting a first possible embodiment of a control slot intended to carry control data to be used for resource management in a telecommunication system according to the invention.

FIG. 2 diagrammatically depicts a radio signal Rfsg to be transmitted between two transceivers in accordance with a known technique, said signal Rfsg being formatted so as to allow transmission of a control slot CNTS as described hereinbefore within a time duration specifically allocated to a control channel CNTCH, which is separate from another time duration specifically allocated to a communication channel CMNCH intended to allow transmission of ordinary communication data CMDAT.

Figure 3:
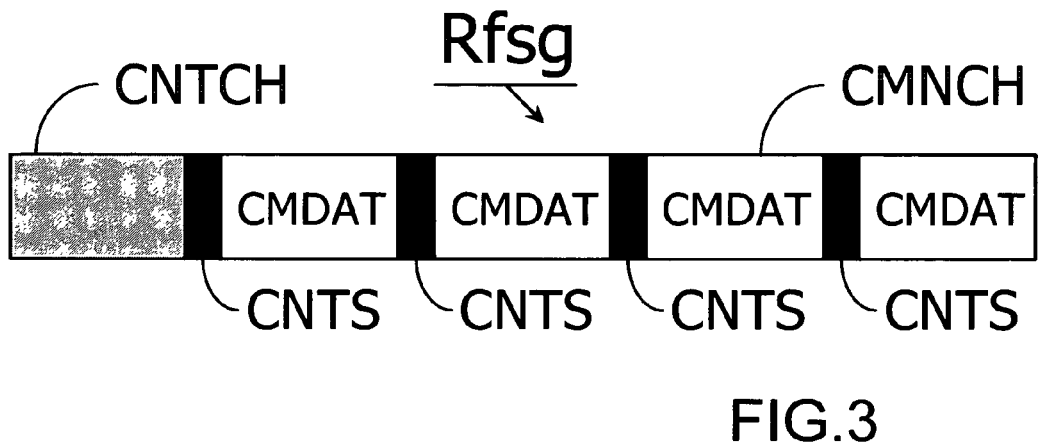
FIG. 3 is another chronogram depicting a second possible embodiment of a control slot intended to carry control data to be used for resource management in a telecommunication system according to the invention.

FIG. 3 diagrammatically depicts a radio signal Rfsg to be transmitted between two transceivers in accordance with an embodiment of the invention, said signal Rfsg being formatted in such a way that transmission of a control slot CNTS over an already defined control channel CNTCH is not allowed, because this format predates the invention. In this embodiment of the invention, a plurality of control slots CNTS are inserted within the very communication channel CMNCH in order to allow transmission of control data amongst ordinary communication data CMDAT.

Such an insertion of control slots CNTS within the communication channel CMNCH allows to use the invention in telecommunication systems comprising at least one and possibly a plurality of already existing communication networks, thus offering a plurality of frequency bands to be flexibly allocated with respect to communication conditions affecting the wireless link established between the system and the user, on the one hand, and with respect to the loads of the single or multiple communication networks included in said system, on the other hand.

Each of these control slots CNTS may include data representing a control signal intended to drive frequency switching means. A control slot CNTS may also include data representing measured values such as those described above, but also possibly a desired data rate or an identifier of a communication network to which the dual base station shall be connected, as will be explained hereinafter.

Figures 4A, 4B:
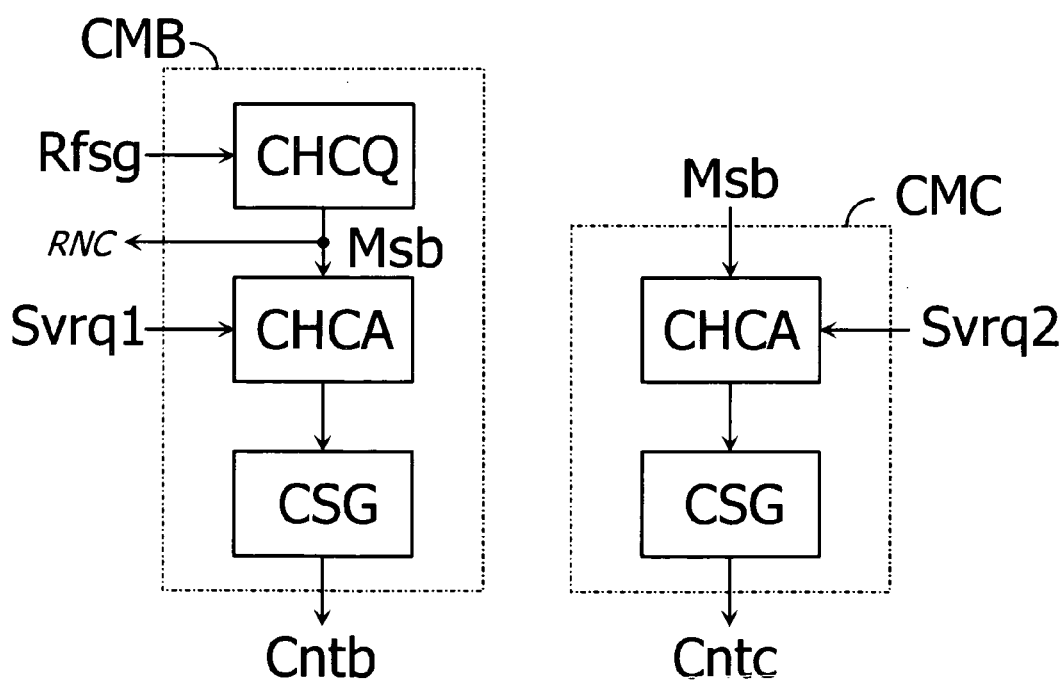
FIGS. 4A and 4B are schematic diagrams depicting a first and a second variant of a specific embodiment of a hardware-oriented aspect of the invention.

FIGS. 4A and 4B depict possible embodiments of the above-described base station controlling module CMB and network controlling module CMC respectively included in a radio base station and in a radio network controller. The base station controlling module CMB shown in FIG. 4A includes quantifying means CHSQ intended to quantify at least one parameter representative of communication conditions affecting the wireless link established between the mobile terminal and said dual base station. Such an operation will be performed on the basis of the radio signal Rfsg received through said wireless link, and will produce at least one measured value Msb of one or more predefined parameters such as a power level, a Signal-to-Interference Ratio (SIR), a Signal-to-Interference plus Noise Ratio (SINR), a Doppler frequency or a delay spread in a case where the data to be transmitted is carried within the received signal Rfsg by means of pulse sequences. As explained above, this at least one measured value Msb may be sent to a radio network controller of the communication network with which the base station is connected, in addition to being fed to analysing means CHCA intended to analyse said measured value Msb with respect to at least one predetermined requirement expressed in the form of a Quality of Service (QoS) indicator, in a maximal tolerable delay value, in a maximal packet error rate value, etc., represented, in the example shown here, by at least one value of a first requirement signal Svrq1 fed to said analysing means CHCA.

The station controlling module CMB also includes generating means CSG for generating a control signal Cntb resulting from the analysis performed by the analysing means CHCA and intended to control the frequency switching means as already explained above, mainly by triggering a switching of the current operating frequency, selected from a given band of frequencies, towards another operating frequency selected from another band of available frequencies if a comparison of the measured value Msb with the value of the first requirement signal Svrq1 performed by the analysing means concludes that the predetermined requirements defined by said first requirement signal Svrq1 are not met by the ongoing communication.

The network controlling module CMC shown in FIG. 4B does not include quantifying means CHSQ, but includes analysing means CHCA and generating means CSG similar to those described above, the analysing means CHCA being intended to perform a comparison between the value of a second requirement signal Svrq2 and that of at least one measured value Msb received from another transceiver, the generating means CSG intended to deliver a control signal Cntc intended to control the frequency switching means included in that other transceiver.

This second requirement signal Srvq2 may be similar to the first requirement signal Svrq1 described above, but it may also represent parameters relelated to the load of the communication network, which will enable to prompt a frequency switching even if all user-related requirements were to be met by an ongoing communication.

It should be noted here that a mobile terminal may itself include a controlling module similar to the station controlling module CMB shown in FIG. 4A for controlling frequency switching means included in said mobile terminal itself, which controlling module will further enable said mobile terminal to produce its own measured value or set of measured values similar to the measured value Msb, and send it to a base station which may additionally be equipped with a controlling module similar to the network controlling module CMC shown in FIG. 4B, which base station would then also be able to remotely control the frequency switching means included in the mobile terminal.

Figure 5:
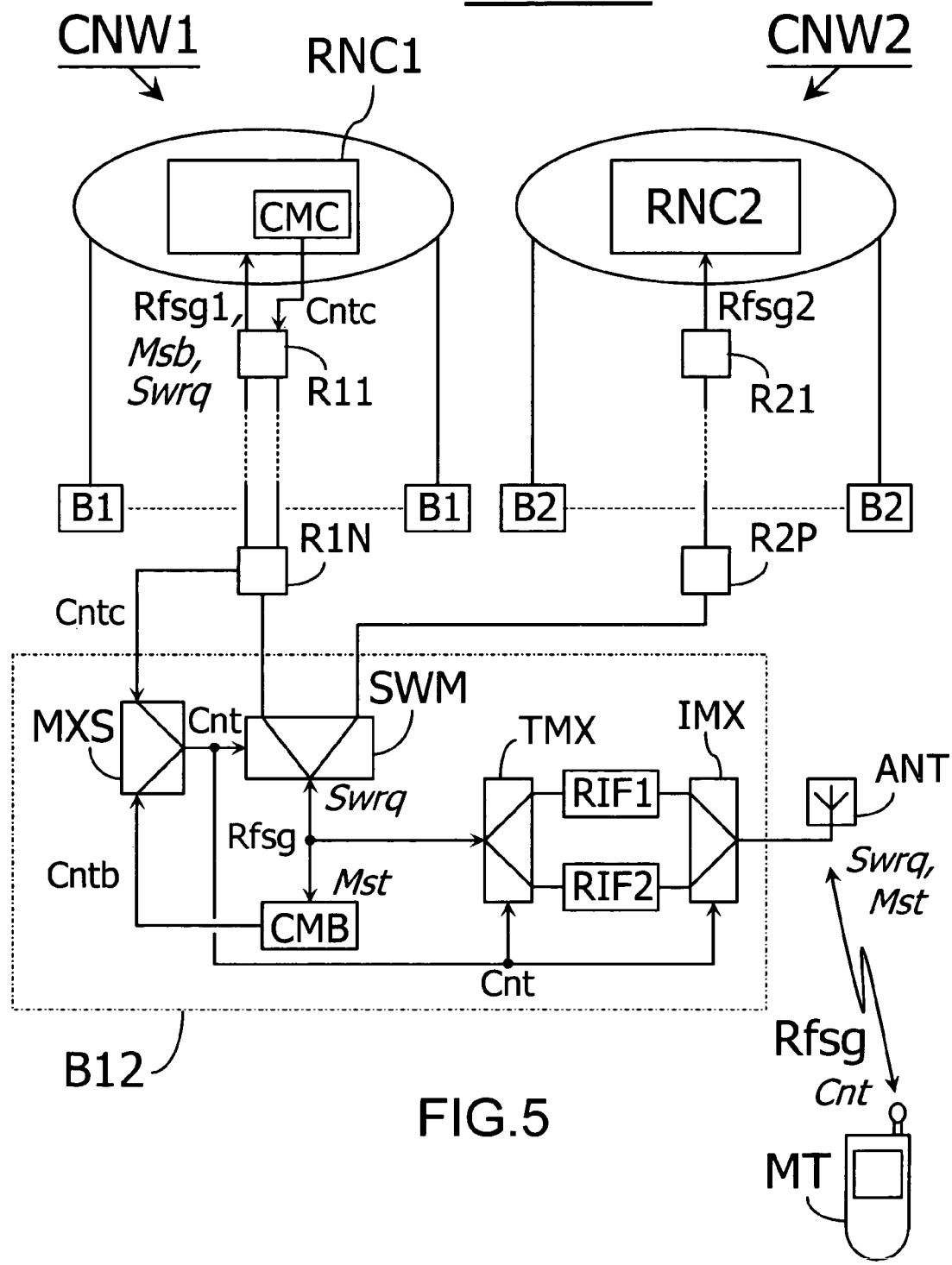
FIG. 5 is a schematic diagram depicting another telecommunication system in which a variant of the invention is embodied.

FIG. 5 is a block diagram which schematically depicts another telecommunication system SYST2 in which a variant of the invention is embodied. This telecommunication system SYST2 includes a first and a second communication network CNW1 and CNW2 including respective first and second groups of radio base stations B1 and B2 able to communicate with at least one mobile terminal MT through at least one wireless link supported by an antenna device ANT, and intended to operate at a frequency selected amongst a first and a second frequency bands respectively allocated to the first and second communication networks CNW1 and CNW2, for example [824.2-893.8 MHz] and [1920-2170 MHz] frequency bands which would respectively be allocated to GSM and UMTS networks. In the example depicted here, a specific dual base station B12 belongs both to the first and second groups and thus to both the first and second communication networks CNW1 and CNW2, and communicates with the mobile terminal MT through a wireless link carrying a radio signal Rfsg. In accordance with this variant of the invention, the dual base station B12 shown here includes, in addition to the above-described frequency switching means (TMX, IMX), network switching means SWM for redirecting a communication established between the terminal and one of the first and second communication networks CNW1 or CNW2 towards the other communication network CNW2 or CNW1, which network switching means SWM are intended to be dynamically controlled according to ongoing communication conditions.

In the example described here, the mobile terminal MT will be deemed connected initially with the first communication network CNW1, which entails that data Rfsg1 representing the radio signal Rfsg in a format compatible with the operation of the first communication network CNW1 is transmitted by and to the dual base station B12 through a networking route R11 . . . R1N defined by a first radio network controller RNC1 intended to manage the operation of the first communication network CNW1.

More specifically, the dual base station B12 includes a base station controlling module CMB intended to be fed, through first and second radio interface modules RIF1 and RIF2 similar to those described in relation with FIG. 1, with a radio signal Rfsg transmitted by the mobile terminal MT and picked up by antenna device ANT. The base station controlling module CMB provided in this particular example is intended to generate a base station control signal Cntb able to control the frequency switching means (TMX, IMX) and the network switching means SWM. This base station controlling module CMB is also able to generate base station measured values Msb of quantified parameters representative of communication conditions affecting the wireless link established between the mobile terminal MT the said dual base station B12, as seen from said base station B12, and to send these measured values Ms, via the network switching means SWM and the established networking route R11 . . . R1N, to the network controlling module CMC included in the first radio network controller RNC1.

After having processed the control data, the radio network controller RNC1 may in this example generate a network control signal Cntc also able to control the network switching means SWM. A selection between the base station control signal Cntb and the network control signal Cntc will be performed by a multiplexer MXS in order to deliver a control signal Cnt to the frequency switching means (TMX, IMX) and to the network switching means SWM, the selection being made according to a setting which has already been described hereinbefore.

A priority setting step may have also defined a default choice either with the aim of providing optimal quality to the user of the mobile terminal, or with the aim of providing optimal allocation of the radio resources of the system SYST2.

A communication network identified as priority target for the network switching step may thus be that one of the first and second communication networks CNW1 and CNW2 which features a wider band of available carrying frequencies, for example a W-CDMA (standing for "Wideband-Code Division Multiple Access) communication network of the third generation as compared to a GSM communication network of the second generation.

The communication network identified as priority target in the course of the priority setting step may alternatively be that one of the first and second communication networks CNW1 and CNW2 which features higher operating frequencies, thus ensuring that a user of the mobile terminal MT will be connected by default to that communication network which offers the highest data rate, i.e. in principle the best quality of service.

In the hypothesis depicted here, when a suitable control signal Cnt prompts the network switching means SWM to redirect towards the second communication network CNW2 the communication initially established between the mobile terminal MT and the first communication network CNW1, the same control signal Cnt orders the frequency switching means (TMX, IMX) to switch the operating frequency of the wireless link, as has already been described above, so that any delay introduced by the redirection process, which is far more complex and thus slower than the frequency switching process, will not have any significant effect on the continuity of the communication, which will be supported by the first communication network CNW1 until a new networking route R21 . . . R2P is opened towards the second communication network CNW2 at the end of the redirection process, after which data Rfsg2 representing the radio signal Rfsg in a format compatible with the operation of the second communication network CNW2 will be transmitted by and to the dual base station B12.

It should also be noted that, in a specific embodiment of this variant of the invention, a switching request Swrq sent by the terminal in the form of a control slot included in a communication channel supported by the radio signal Rfsg may also be used for allowing the mobile terminal MT to transmit a network switching request in an uplink direction, which will give allow said terminal MT to have an influence on the inter-network switching process described above.

The invention claimed is:

1. A method for transmitting data in a telecommunication system having at least one communication network including one dual base station communicably linked with at least one mobile terminal through a wireless link, the method comprising:

inserting a control slot within a communication channel established over the wireless link, said control slot including data representing a control signal for driving a frequency switching of the base stations and the mobile terminal of the wireless link;

transmitting, from the one dual base station, said control slot within a time duration specifically allocated to a control channel, which is separate from another time duration specifically allocated to said communication channel; and then, switching an operating frequency of the one dual base station and the mobile terminal of the wireless link from a first frequency band to a second frequency band based on said data in said control slot.

2. The method as claimed in claim 1, further comprising:
setting at least one of the first and second frequency bands as a priority target for said switching an operating frequency.

3. The method as claimed in claim 2, wherein the frequency band identified as the priority target is a frequency band having a wider band of available carrying frequencies.

4. The method as claimed in claim 2, wherein the frequency band identified as the priority target is a frequency band having a majority of a plurality of higher operating frequencies.

5. The method as claimed in any one of claims 1 to 4, wherein the telecommunication system includes at least a first and a second communication network having respective first and second groups of radio base stations communicably linked with at least one mobile terminal through the wireless link, the wireless link having an operating frequency included in one of the first and second frequency bands, respectively, and the one dual base station belonging both to the first and second groups, the method further comprising:
redirecting a communication established between the terminal and one of the first and second communication networks towards the other communication network, the redirecting being performed by said one dual base station after the frequency switching step.

6. The method as claimed in claim 1, wherein the telecommunication system includes at least a first and a second communication network having respective first and second groups of radio base stations communicably linked with at least one mobile terminal through the wireless link, the wireless link having an operating frequency included in one of the first and second frequency bands, respectively, and the one dual base station belonging both to the first and second groups, the method further comprising:
quantifying at least one parameter representative of communication conditions affecting the wireless link established between the mobile terminal and the one dual base station.

7. The method as claimed in claim 6, further comprising:
analysing said at least one parameter quantified in the quantifying step according to predetermined requirements.

8. The method as claimed in claim 7, further comprising:
generating at least one control signal resulting from the analysing, wherein at least one operation mode of the frequency switching is determined by at least one value of said control signal.

9. The method as claimed in claim 1, wherein a plurality of control slots are inserted within said communication channel.

10. A telecommunication system, comprising:
at least one communication network having a group of radio base stations communicably linked with at least one mobile terminal through a wireless link, the group including a dual base station provided with a frequency switching unit configured to switch an operating frequency of the base stations and the mobile terminal of the wireless link from a first frequency band to a second frequency band based on control data in a control slot; and a control signal transmission unit configured to transmit, from the dual base station, the control slot prior to switching the operating frequency and within a time duration specifically allocated to a control channel, which is separate from another time duration specifically allocated to said communication channel, wherein said control slot is inserted within a communication channel established over the wireless link, said control data represents a control signal for driving the frequency switching unit.

11. The telecommunication system as claimed in claim 10, further comprising:
a quantifying unit configured to quantify at least one parameter representative of communication conditions affecting the wireless link established between the mobile terminal and said dual base station;

an analysing unit configured to analyse said at least one parameter quantified by the quantifying unit according to predetermined requirements; and a generating unit configured to generate at least one control signal resulting from an analysis performed by the analysing unit, at least one operation mode of the frequency switching unit being determined by at least one value of said control signal.

12. The telecommunication system as claimed in claim 11, wherein said one dual base station includes the quantifying unit, the analysing unit, and the generating unit.

13. The telecommunication system as claimed in claim 11, wherein said one dual base station includes the quantifying unit, and at least one of the communication networks includes a radio network controller including the analysing unit and the generating unit.

14. A transceiver communicably linked with at least one mobile terminal through a wireless link in a telecommunication system having at least one communication network including at least one dual base station, comprising:
a frequency switching unit configured to switch an operating frequency of the base stations and the mobile terminal of the wireless link from a first frequency band to a second frequency band based on control data in a control slot inserted within a communication channel established over the wireless link; and a control signal transmission unit configured to transmit, from the at least one dual base station, the control slot prior to switching the operating frequency and within a time duration specifically allocated to a control channel, which is separate from another time duration specifically allocated to said communication channel, wherein said control data represents a control signal for driving said frequency switching unit.

* * * * *